United States Patent [19]

Nigg

[11] 4,230,408
[45] Oct. 28, 1980

[54] SYSTEM FOR OVERALL COLOR CORRECTION OF COLOR PICTURE INFORMATION CONTAINED IN A PROJECTING MULTI-COLOR LIGHT BEAM

[76] Inventor: Jurg Nigg, Beckenhofstrasse 30, 8006 Zurich, Switzerland

[21] Appl. No.: 876,783

[22] Filed: Feb. 10, 1978

Related U.S. Application Data

[63] Continuation-in-part of Ser. No. 704,728, Jul. 12, 1976, Pat. No. 4,087,176, which is a continuation-in-part of Ser. No. 424,040, Dec. 12, 1973, abandoned.

[30] Foreign Application Priority Data

Dec. 4, 1972 [CH] Switzerland .................. 18254/72

[51] Int. Cl.³ .................. G03B 27/72; G03B 27/76
[52] U.S. Cl. .................. 355/35; 354/103; 355/46; 355/77
[58] Field of Search .................. 355/32, 35, 77, 88, 355/33, 46, 43; 354/100, 103

[56] References Cited

U.S. PATENT DOCUMENTS

| | | | |
|---|---|---|---|
| 2,273,112 | 2/1942 | Kleinhenz | 355/32 |
| 2,491,018 | 12/1949 | Thomas | 355/32 X |
| 3,459,888 | 8/1969 | Sokolov | 355/43 X |
| 3,488,190 | 1/1970 | Smith | 355/32 X |
| 3,495,518 | 2/1970 | Takagi et al. | 355/32 X |
| 3,580,151 | 5/1971 | Hudson et al. | 354/100 |
| 3,589,811 | 6/1971 | Berger | 355/32 |
| 3,796,487 | 3/1974 | Voorhees | 355/43 |

FOREIGN PATENT DOCUMENTS

2035431 7/1972 Fed. Rep. of Germany .
2365230 7/1975 Fed. Rep. of Germany .
2360691 12/1976 Fed. Rep. of Germany .

Primary Examiner—Richard A. Wintercorn
Attorney, Agent, or Firm—Lawrence Rosen; E. Janet Berry

[57] ABSTRACT

A color correction system contains a plurality of color channels which each contain a dichroic mirror and an electro-optical modulator. An unpolarized light source shining through a color transparency serves as the input to each channel, and each color is individually controlled by the electro-optical modulator in its respective channel. The colors of each channel are then recombined after correction. In another embodiment of the invention, each channel further includes mono-color film storage means as black and white film storage means to store the color image of the particular channel on such an inexpensive film for subsequent reconstruction as a picture of different color than the film color. In a further embodiment, a plurality of separate colors of the same color image are stored on spaced regions of a given frame area of a mono-color negative, especially of a black and white negative, along with verbal information which is to be projected with the corresponding color image.

21 Claims, 11 Drawing Figures

SYSTEM FOR OVERALL COLOR CORRECTION OF COLOR PICTURE INFORMATION CONTAINED IN A PROJECTING MULTI-COLOR LIGHT BEAM

RELATED APPLICATIONS

This application is a continuation-in-part of U.S. Application Ser. No. 704,728, filed July 12, 1976, now U.S. Pat. No. 4,087,176 which was in turn a continuation-in-part of Application Ser. No. 424,040, filed Dec. 12, 1973, now abandoned.

BACKGROUND OF THE INVENTION

This invention relates to a color separation and additive color mixing system for photographic, cinematographic and/or telecommunication equipment, with means for intensity control of the various color channels, and with means for storage of the color information in each color channel on a mono-color storage medium.

In one embodiment of the invention, the system can be used to store color and contour picture information contained in a single multi-color light beam on several mono-color film media, especially on black and white film media. For this purpose the light beam, comprising color and contour information of a colored picture, is split into several mono-color beams of selected color band e.g. in three beams having the three basic colors red, green and blue, respectively. The mono-color beams are individually intensity corrected by light modulators without losing any of their contour information. After these intensity corrections, the contour information and the overall mono-color intensity information of the mono-color beams can be stored on mono-color film media, the color of which being independent of the beam colors, as on black and white film media. With this technique, it becomes possible to store multi-color pictures from either color films, color transparencies, or from directly projected images from natural surroundings mono-color film media as on black and white film which is much cheaper than color film. Especially any suitable black and white film can be used, including those that do not require silver, these films being much less expensive than presently available color films. Very inexpensive films which can also be used are Diazo-films.

The same system can be used to reproduce color pictures from the mono-color film media as from the black and white film media, each color of the picture being stored on respective mono-color film pictures, according to the number of color channels used in the storage process. The different film media which contain each contour and mono-color intensity information of a stored multi-color picture in therefrom independent color are respectively positioned in a mono-color light beam which is produced by splitting a multi-color light beam into mono-color light beams of the same color band as the light beams which were used for production of the black and white film media. After modulation by the films, the mono-color light beams will contain the correct contour and intensity information of the picture to be projected. Here again, intensity can be corrected by light modulators in the mono-color beams and a resulting multi-color beam produced by additively mixing the mono-color beams will reproduce the stored multi-color picture with corrected color components.

In accordance with the present invention, the information in each of the mono-color light beams can be stored either before or after color correction on a spaced area or within one frame of a mono-color negative, the negative's color being independent of either picture- or beam-color. The full color image can then be reproduced by projecting suitable mono-color beams through each of the transparency regions and recombining the beams to reform the full color image which was stored. Thus a single inexpensive mono-color e.g. black and white negative can be used to store all of the information needed to project a color image. Color correction can be done during projection.

If desired, each of the negative sets of color information, which could define one frame of a motion picture type negative can also contain verbal information corresponding to the frame.

The novel system of the invention is also useful for film copying techniques, copying one color film from another, the color composition of the former being corrected in each color channel. Splitting of the image into color channels and recombining the mono-color channels can be performed in one step without intermediate storing on black and white film media or on other mono-color film media.

Known devices for controlling light intensity include mechanical shutters, sometimes called light modulators. The shutters may be mechanically controlled by double flaps moved by a servo-motor. These techniques are disadvantageous in that the switching time for changing the light amplitude between 0% and 100% is relatively long, typically about $2 \times 10^{-3}$ seconds. Owing to this disadvantage, it is practically impossible, in film copying techniques, to exceed printing speeds of about 3000 m/h. For high quality prints, the maximum speed now used is as low as 2000 m/h.

A second disadvantage of the above-mentioned mechanical shutters is that they switch over with residual oscillations or bounce, which results in significant color flicker, lowering the quality of color pictures.

A third significant disadvantage is that mechanical shutters do not permit infinite variation of the intensity of a modulated beam. Moreover, since intensity modulation is always performed by changing aperture cross-section, the picture periphery will be damaged without additional optics.

In another known light-intensity control device, a number of filters, for instance eight filters, are shot into a magazine filled with silicone oil by compressed air. This system is of the mechanical type and also has the first two disadvantages mentioned above for the shutter.

It is one object of the present invention to provide an overall color correction system which has a substantially shorter switching time for intensity control and better color separation between the various color channels, so that color pictures of higher quality can finally be obtained than was heretofore possible.

Another object of this invention is to provide an inexpensive method and apparatus for storage of color images on mono-color film, especially on black and white or Diazo-film.

The arrangement of the present invention allows substantial reduction of the switchover time for intensity level variations. Thus, the invention provides a system which comprises anti-reflex coated dichroic filter glasses for the purpose of color separation, and further comprises controlled electro-optical or magneto-optical cells for intensity control of the various color channels and which permit short-time control of the color channels in such a manner that intensity control with respect to the color channels takes place without overlapping and without any residual oscillation. This arrangement substantially reduces the switching time for impulse control.

The switching time from a maximum transparency to a minimum may be shorter than $10^{-5}$ seconds. With this improvement, it is possible to make film copying machines which are able to process film at a speed of about 30,000 m/h.

As compared to the mechanical behavior of mechanical shutters, electric switching behavior of the modulators' control elements can be varied, and the switching behavior exactly predicted and modified. The use of electro-optic or magneto-optic light modulators ensures that the change from one transparency level to another can be optimally fitted to individual needs. By enlarging the rising or falling times in switching from one level to another according to correction values of subsequent pictures, one can smooth the switch-over from one picture to the next. As the switching behavior of electric circuits (step response) is given by their damping factors, the influence of one switching cycle to the next can be influenced by changing this factor, so that step response of the circuit will reach a "low" value only to a selectable amount before the next positive switching step is applied. If the step response reaches a "low" value before the next positive switching step is applied, overlapping can completely be omitted.

BRIEF DESCRIPTION OF THE DRAWINGS

Several embodiments of the invention will now be described hereafter by way of examples with reference to the accompanying drawings.

FIG. 4c shows an example of intensity requirements of picture sequence according to FIG. 4a.

DETAILED DESCRIPTION OF THE DRAWINGS

Figure 1:
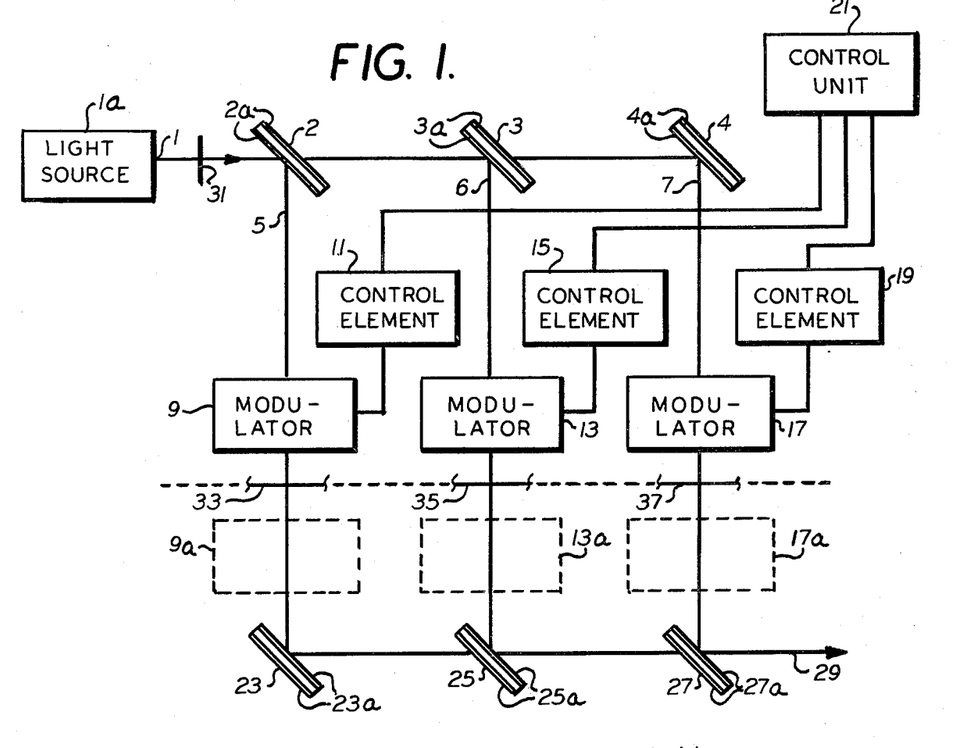
FIG. 1 shows a system diagram of the embodiment described showing different possibilities of system use.

The drawing shows a multi-color beam 1 passes through three partly permeable dichroic mirrors 2, 3, 4. The multi-color beam 1, e.g. a white, light beam, can emanate from a light source 1a or can be created from the light imaged by an optical lens system, or light from a camera or directly from natural surroundings. In one embodiment of the invention, beam 1 from lamp 1a is an unpolarized white, light source which is appropriately collimated, and then modulated by passing through a color transparency 31. If the light source 1a is used, it can contain a single wide spectrum lamp, or can contain several light sources of different colors, which may contain HG, Na or Cd vapor lamps and the like. A suitabale heat filter (not shown) may be arranged between the light source or source 1a and the following optical system.

Each of said mirrors 2, 3 and 4 reflects one of the color components red, green or blue, as mono-color beams 5, 6 and 7 of a respective color channel. The reflected red beam is attenuated by a first intensity modulator 9 which has an appropriate intensity control element 11. Similarly, the blue mono-color beam 6 is attenuated by a modulator 13, controlled by a control element 15, and the third, green mono-color beam 7 is attenuated by a modulator 17 controlled by a control element 19. The modulators 9, 13 or 17 may be either of electro-optical or magneto-optical type and may more generally be of the field controlled type. If the light source 1a or light beam 1 is non-polarized light, suitable polarizers may be placed in front of each of modulators 9, 13 and 17.

Modulators 9, 13 and 17 may be Faraday systems or Kerr cells or resonator controlled crystals such a ammonium dihydrogen phosphate crystals (ADP) or potassium dihydrogen phosphate crystals (KDP). As is well known, Kerr cells require relatively high control voltages of several thousand volts. The use of ADP and KDP crystals are advantageous since they require lower control voltages of about 50 volts when high Q HF-resonators are used as control elements. These resonators can be cavity resonators or coaxial resonators (Lecher resonators) and have a high resonance frequency e.g. in the MHz, or even GHz range. ADP or KDP crystals activated by such oscillations will, as is known in the art, become transmittent or non-transmittent in synchronism with the resonators' oscillations. These on/off switching frequencies are much too high for detection by the human eye. If the control elements comprise, as just described, high frequency resonators, one can control the rising or falling time of the resonators' oscillations to their stationary amplitudes and back to zero by choosing the appropriate damping factor, given by the resonance frequency and the Q factor (loaded Q). The switching behavior of ADP or KDP crystals when switching from one transmission level to another can, therefore, be controlled by selection of resonators' Q factor. This factor can be varied with tuner plungers, as is known in microwave art.

Other modulators which can be used are ultrasonic modulators which belong to the electro-optical category.

The output beams from the modulators 9, 13 and 17, of the drawing are deflected by partly permeable dichroic mirrors 21, 25 and 27 and subsequently additively mixed to result in a multi-color output beam 29.

The plane of mirrors 2, 3, 4 and of mirrors 23, 25 and 27 are preferably tilted with respect to the optical axes of the input and output beams 1 and 29, respectively, by 30° and not by 45° as is conventional, thereby reducing significantly the polarization effect at the surfaces of mirrors 2, 3, 4, 23, 25 and 27.

The mirrors 2, 3, 4, 23, 25 and 27 can act as color filters of extremely good discrimination effect when provided with anti-reflex coatings 2a, 3a, 4a, 23a, 25a and 27a, on one or both of their surfaces so as to eliminate double reflection. These anti-reflex coatings will be matched to the particular color bands of the beams having to be reflected on the particular mirror. The use of anti-reflex coatings also prevents the occurrence of double images, and further results in a substantially higher brilliance of the colors.

The control elements 11, 15 and 19, control the modulators 9, 13 and 17, respectively, in the usual manner, and receive control signals from a control unit 21 which controls the control elements 11, 15 and 19 in order to vary light intensity of the mono-color beams 5, 6 and 7 by changing transparency of the modulators 9, 13 and 17, respectively. These electrical signals will have a suitable character depending upon the choice of the modulators and their control elements.

The control unit 21 will provide a series of control signals to the control elements to change the channel intensity by an amount related to control signal frequency, this frequency being suitable for film copying operations. Thus, damping-factor-influenced switching behavior will result in greater or smaller overlapping zones of intensity modulation cycles according to subsequent pictures.

Information as to how the mono-color beam intensities are to be varied can be obtained from light intensity measurements in each mono-color beam or in the resultant multi-color beam 29. The control unit 21 can also be used to store previously determined color correction values and to generate appropriate preprogrammed correction signals for control elements 11, 15 and 19.

The system may be used to produce mono-colored e.g. black and white transparencies or films from a multi-color image containing beam 1. Beam 1 may be produced as an image of natural surroundings or can be the image in a camera system, or as previously described, can be produced by color transparency 31. Thus, transparency 31 can introduce, in a beam of white light source 1a, contour- and mono-color-intensity information of the picutre. Each of the three color channels containing beams 5, 6 and 7 may now further contain three film-media 33, 35 and 37, e.g. black and white films which will store the information in the mono-color beams 5, 6 and 7. For this purpose, only the upper part of the system shown in the drawing will be used, without the recombining mirrors 23, 25 and 27, the dashed line showing the division of the whole system in two sub-systems.

If color pictures stored e.g. on black and white film media produced as described above, are to be reproduced, they will have to be first projected from the specific films by mono-color light beams of the same color by which they were produced and then recombined in the lower part of the system, by recombining mirrors 23, 25 and 27 to produce an output beam 29 which contains all information for color picture projection. In this case the entire system shown in the figure can be used, in that the projecting mono-color beams can be produced by a splitting system as shown in the upper part of the system or with the mono-color beams passing through black and white or mono-color transparencies at the locations 33, 35 and 37.

Correction of the intensities of the mono-color beams can be affected during copying on the films by modulators 9, 13 and 17 which are arranged in the respective mono-color beam channels as shown in the figure, and can be affected during reproduction by similar modulators 9a, 13a and 17a with appropriate control elements positioned between the film media 33, 35 and 37 and mirrors 23, 25 and 27. It has to be pointed out that the film media at 33, 35, 37 can be different mono-color films or can all be the same mono-color films as e.g. all black and white films or can be multi-color films.

When using the system for copying color films or transparencies at position 31 onto the films at positions 33, 35 and 37, high brilliance of the color picture will be improved when using a tungsten band lamp or a similar light source 1a, to produce the multi-color beam 1. The incandescent surface of such lamps develops an absolutely uniform light density and thus prevents light polarization, as is caused by the helical filaments of ordinary bulbs. Tungsten band lamps will also be preferably used in reproducing color pcitures from stored images 33, 35 and 37, with the same advantages.

It is obvious that the intensity of the multi-color beams 1 and 29 can be influenced by using grey filters or graded grey filters based on light reflection or light absorption or by using color filters (so-called trimming filters). Such filters can also be introduced in other beam parts, especially in the mono-color beams to appropriately offset their intensities.

Instead of using dichroic mirrors for mirrors 2, 3, 4, 23, 25 and 27, which act as reflection filters, it is also possible to use transmission filters or absorption filters and combinations of the various filter types. According to the kind of filters chosen, the multi-color beam will have to be split into a number of multi-color beams which will be filtered, as by absorption filters, to produce the mono-color beams. These techniques are well known and need not be described here. It is also possible to insert glass-fibre conductors at any point of the beam path and to arrange certain parts of the system optically remote from others.

Finally, the modulators 9, 13 and 17 and 9a, 13a and 17a may consist of liquified crystals if a frame frequency not higher than about 25 frames a second is acceptable.

It is also possible to use, instead of the mentioned light modulators, light multipliers acting as modulators.

With this system, it is possible to store color pictures on film media, especially black and white or Diazomedia, and to reproduce the original color pictures from said film media. It is also possible to directly copy color pictures, e.g. on color films. It is possible to correct the intensity of the various color contents at high switching frequencies to allow film copying at speeds up to 30,000 m/h. By selecting the switchover characteristics of intensity levels, intensity changes can be made more or less abrupt. The intensity level of the various color components can be infinitely varied, either as a function of picture copying speed or independently therefrom.

Figure 2:
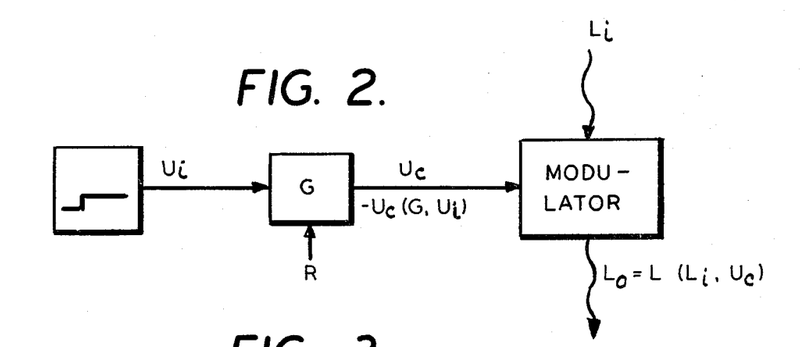
FIG. 2 shows a block diagram of a system for controlling a modulator with DC-voltage and changing the system switching behavior when switched from one intensity level to another.
Figure 4A:
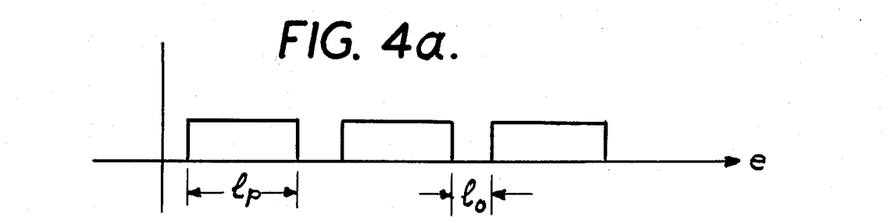
FIG. 4a shows a picture sequence, e.g., on a film medium.
Figure 4B:
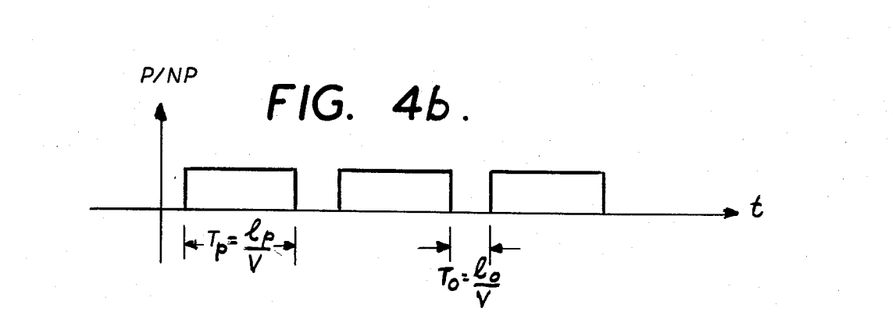
FIG. 4b shows the time relations during which a picture sequence according to FIG. 4a and the film medium speed "v" appears in a projecting light beam.
Figure 4C:
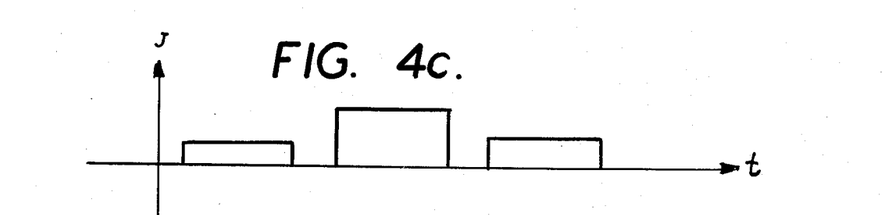
Figure 4D:
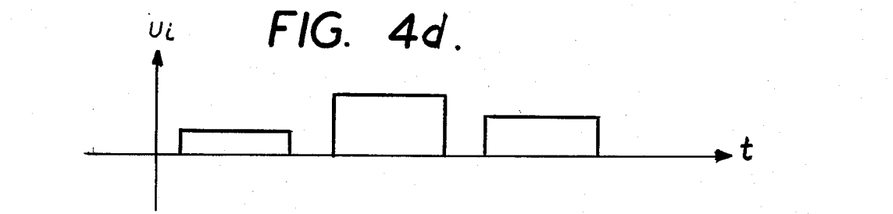
FIG. 4d shows the qualitative characteristic of the output voltage of the control unit according to the intensity correction requirements.
Figure 4E:
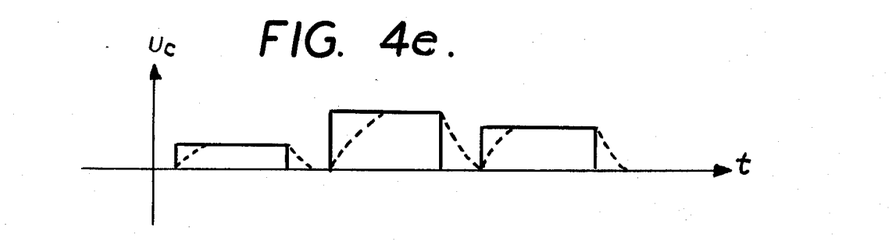
FIG. 4e shows the qualitative characteristic of the control voltage at the output of the control element according to FIG. 2 without and with enlargement of the rising, respectively falling times.

FIG. 2 schematically shows a light modulator with an input light beam $L_i$ and an output beam $L_0$ the intensity of which is a function of the input beam intensity and the modulator control voltage $U_c$. The control element G provides the control voltage $U_c$ according to its input voltage $U_i$ which is generated in a control unit. As the modulator in this example shall be DC-voltage controllable, the control unit provides a DC output voltage $U_i$ with changeable level according to intensity correction requirements as for example shown in FIG. 4d. For changing the response of $U_c$ with respect to level variations of the DC voltage $U_i$, the control element G can e.g., consist of a RC-T-network with variable resistance R. According to the transmission function G (p) of the control element the control voltage $U_c$ will show changeable rising and falling times as is qualitatively shown in FIG. 4e.

Figure 3:
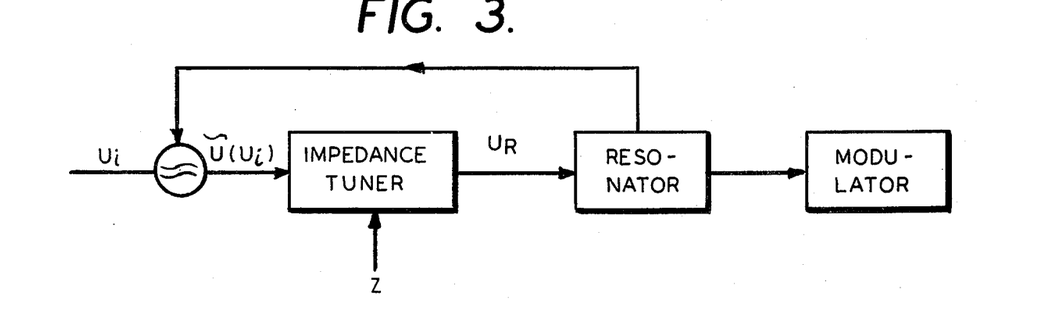
FIG. 3 shows a block diagram of a system for controlling a modulator with AC-voltage and for changing the time in which the amplitude of a control signal changes from one to another level.

FIG. 3 shows a modulator which is AC-voltage controllable by a resonator, e.g., a cavity resonator. The appearing impedance of the resonator for a microwave generator can be changed by an impedance tuner. According to intensity requirements of succeeding pictures, the microwave generator is amplitude-modulated by the output voltage $U_i$ of a control unit. The resonator will be stimulated to oscillations according to the amplitude of the generator output signal and its coupling to the generator, which is a function of the tuner setting. The amplitude of the resonator's oscillations will change its level with variable times according to the setting of the impedance tuner and so with the coupling of the resonator. As the oscillations will also change its stationary level in dependence on the coupling, it will be necessary to change the modulating effect of $U_i$ on the microwave generator to compensate for changes in stationary amplitude values. This fact is shown by the feedback line from the resonator back to the generator.

AC control of the modulator can obviously also be done by resonator circuits built up with discrete elements if only the resonance frequency is high enough. In such circuits the rising or falling times of the amplitude level can be varied by changing the value of a damping resistor.

Figure 5:
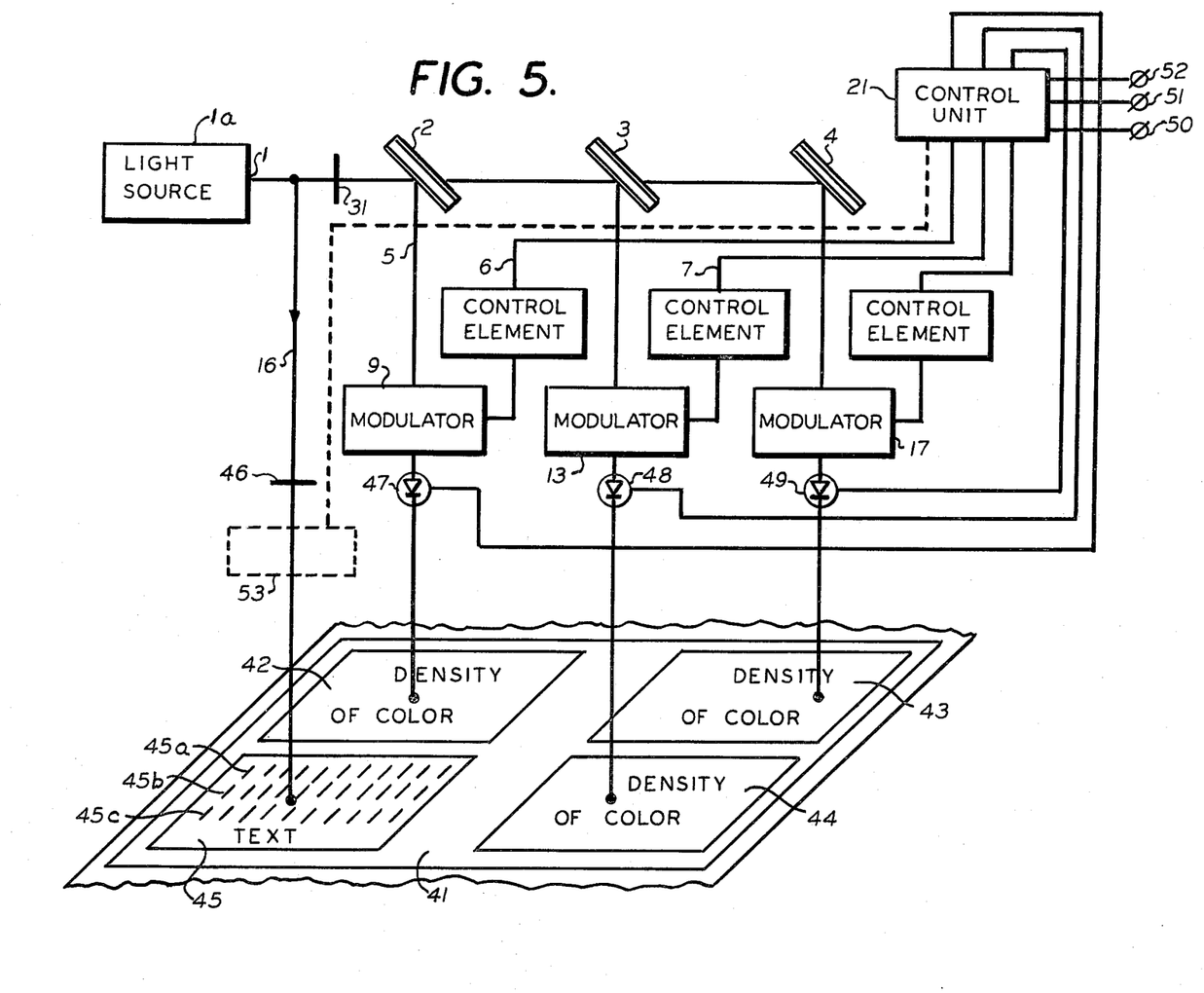
FIG. 5 shows a system diagram similar to that of FIG. 1 where, however, two-dimensional monochromatic color is recorded in respective areas of a common frame of mono-color film as a black and white film.

Referring next to FIG. 5, there is shown a system similar to that of FIG. 1 except that the mono-color negative for receiving two-dimensional information from each channel is shown as consisting of three areas 42, 43 and 44, respectively, within a single frame of an elongated strip of mono-color as of black and white or Diazo-film negative 41. Note that when exposing the film and when reproducing the film, suitable baffles (not shown) for isolating the various areas from one another may be used. Note further that frame 41 could be a single negative and not part of an elongated strip containing a plurality of negatives.

The three areas 42, 43 and 44 are aligned with channels 5, 6 and 7, respectively, which may carry two-dimensional information of a given color, for example, red, green and blue, respectively, and these two dimensional images, which have been suitably corrected by the modulators 9, 13 and 7, respectively, are recorded as mono-colored, e.g. as black and white images in the film regions 42, 43 and 44. Note that suitable lenses and prisms may be provided to direct the light of the various channels toward regions 42, 43 and 44, as shown. Regions 42, 43 and 44 can be laterally or transversely aligned with respect to one another and each of the light beams are appropriately directed. Suitable means are also provided for registering the images which will be formed in areas 42, 43 and 44 so that upon their reproduction and re-combination the images are combined with one another in good registry in order to reproduce the original color tones of the transparency 31.

As further shown in FIG. 5, a fourth region of the single frame shown may contain text information which might correspond to the visual image stored in the given frame. A light channel 16 is suitably derived from the light source 1a and the light beam 16 projects through a suitable mask 46 which contains the text information which is to be presented with the light image.

By way of example, the light beam 16, after being modulated with the text information in the mask 46, can be provided in area 45 of the frame of film 41, shown in FIG. 5, and could, for example, be projected as different lines 46a, 46b and 46c of text information which could be the same information given in their different languages.

As was previously mentioned, a control loop can be provided for controlling modulators 9, 13 and 17. This control loop is shown in FIG. 5 as the loop including light-measuring units 47, 48 and 49, respectively, which measure the intensity of the single color output light beams of the modulators 9, 13 and 17, respectively. The output signals of light-measuring devices 47, 48 and 49 are then connected back to the control unit 21 where they are respectively compared with pre-selected intensity values which can be chosen by the appropriate setting of reference members 50, 51 and 52, respectivly. This automatic feedback control can then be used in any desired manner.

In FIG. 5 and in the description of the application of the supplemental information to frame 45, it will be noted that this information is not contained in the color transparency 31. The information which is to be applied to area 45 can be taken from any desired source which may or may not include the transparency 31. Note that suitable modulation can also be applied to this supplemental information, if desired, by the modulator structure 53 shown in dotted lines which can be connected to and operated by the control unit 21.

In the arrangement of FIG. 5, the color information as well as any desired supplemental information of the color transparency 31 is stored in a single inexpensive mono-color film as in a black and white or Diazo film. Moreover, the system provides for the color correction of the color values of the color transparency so that corrected color values can be stored.

Figure 6:
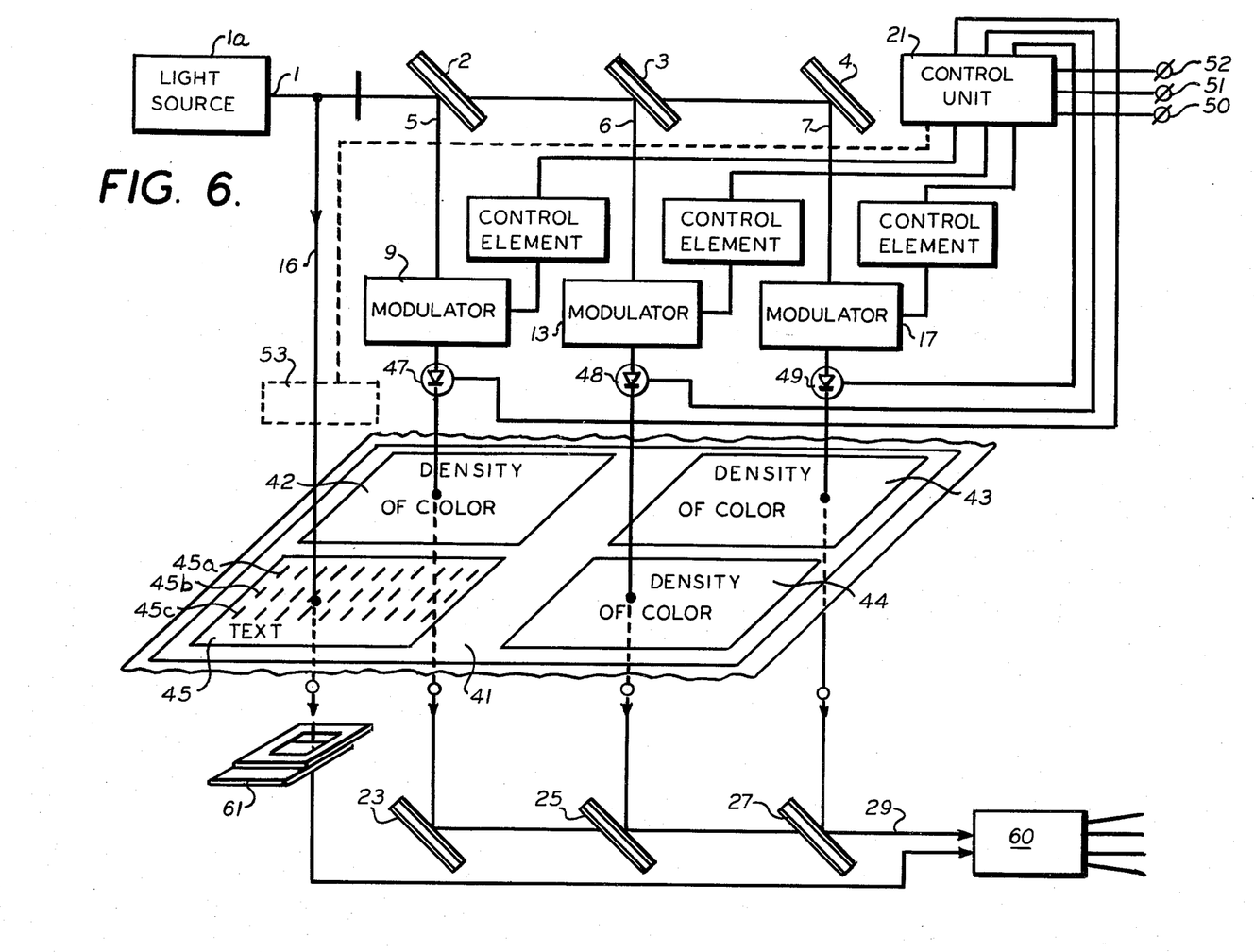
FIG. 6 shows a system diagram for projecting a stored color image from the film of FIG. 5.

FIG. 6 shows means for reproducing a color image from the negative 41 which stores color information in the mono-colored e.g. black and white negative transparency. Thus, in FIG. 6 and as was the case in FIGS. 1 and 5, a white light source 1a is provided which directly projects a focused beam beyond the light splitter mirrors 2, 3 and 4 which produce mono-color beams 5, 6 and 7 as shown. In essence, this structure is identical to that of FIG. 5 except that the color slide 31 is removed. These color beams, which do not contain contour information in FIG. 6 may, if desired, pass through modulators 9, 13 and 17 and through feedback elements 47, 48 and 49 and are then applied to the mono-colored e.g. black and white negative image in regions 42, 43 and 44. Similarly, a light beam 16 is projected through frame region 45.

The mono-color light beams 5, 6 and 7 are then suitably modulated by their respective images 42, 43 and 44 to reproduce the mono-color two-dimensional image having the contour information of the original light beams 5, 6 and 7, respectively, of FIG. 5. These beams are then recombined by the semi-transparent mirrors 23, 25 and 27 into a single light beam 29 containing the full color value of the beam which was modulated by the color transparency 31 in FIG. 5. This beam 29 can then be applied to a suitable projection system, schematically illustrated as the projection system 60, which can have the necessary optics and the like for projecting the suitably color corrected image of the transparency 31. Note that the color correction can take place during printing in FIG. 5 or during projection in FIG. 6, if desired.

During projection in FIG. 6, the light beam 16 reproduces the text information in frame section 45 and this text information can be projected through a suitable shutter 61 which permits the passage only of suitable text information including lines 45a, 45b, or 45c, depending upon which language is to be projected. This information is suitably optically combined with the beam 29 for projection by the projector 60, such that a single color image is projected with the line of information from frame 45 being projected at some suitable location on the frame, as at the frame bottom. Note that the light contained in the projected image of frame section 45 can be selected to be easily distinguishable from the color information and could, for example, be either black on a white background or white on a black background.

In FIG. 5 the system is described in connection with information contained in a color transparency 31. It will be obvious to those skilled in the art that the invention is equally applicable to the reproduction of reflected images reflected from a color surface as well as the images transmitted through a transparency.

Figure 7:
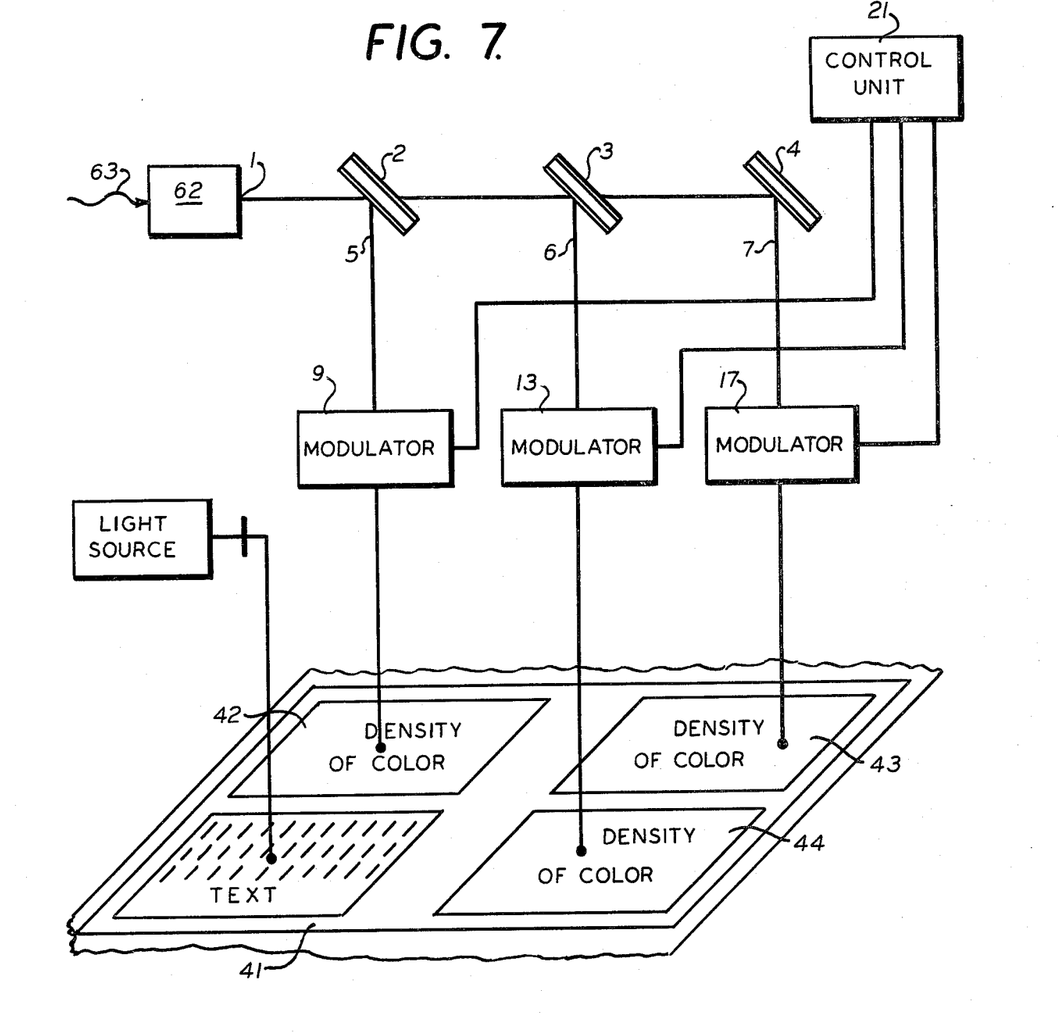
FIG. 7 shows a system similar to that of FIG. 5 for recording the mono-color components of any color scene on mono-color film as on black and white film.

Moreover and in accordance with the invention, the color scene can be provided to the apparatus and to the mono-color film by any suitable optical system and could be any desired color scene. For example, FIG. 7 illustrates the novel information as applied to a camera wherein a suitable optical system 62 consisting of conventional camera optics view an external scene, as schematically illustrated by the incoming arrow 63. An output is produced on the line 1 which is the two-dimensional color scene produced by the optics 62. This color scene is then divided into its color components in the usual manner as by the mirrors 2, 3 and 4 and the mono-color light channels 5, 6 and 7 which carry the contour information of the color scene viewed by the optics 62 apply this information to e.g. the black and white film 41 as was previously described. The modulators 9, 13 and 17 which are controlled by the control unit 21 in FIG. 7 may or may not be used as desired in the system of FIG. 7.

Modulators 9, 13 and 17 used in FIGS. 5, 6 and 7, and in the preceeding drawing, may be of any desired type, as previously described. They may also be opto-ceramic cells such as cells made of PbZr-PbTi or of $LiNbO_3$-$LiTaO_3$.

Although the present invention has been described in connection with a preferred embodiment thereof, many variations and modifications will now become apparent to those skilled in the art. It is preferred, therefore, that the present invention be limited not by the specific disclosure herein, but only by the appended claims.

I claim:

1. A photographic film for storage of an image and of additional information, comprising a film negative having at least two separated, non-overlapping areas, one of said areas containing said additional information and the other of said areas containing the information constituting said image; said one of said areas containing said additional information containing first and second spaced text patterns; said first and second text patterns containing related intelligence which is pertinent to said image; said first and second text patterns being capable of separate display independently of one another to describe a related characteristic of said image.

2. The film of claim 1, said film negative being a black and white negative the areas of which containing respective black and white images.

3. The film of claim 1 wherein said at least three separated, non-overlapping areas record the red, green and blue color contents respectively of said color image.

4. The film of claim 1, wherein said other area of said negative further comprises at least three separated, non-overlapping sub-areas, each of which contains a respective mono-colored image corresponding to the color value of a respective different selected color in said image.

5. The film of claim 1 wherein said first and second text patterns comprise the same information in two different languages.

6. An information storage and retrieval system, comprising:

a photographic film for storing an image and additional information; said film comprising a film negative having at least two separate, non-overlapping areas, one of said areas containing said additional information and the other of said at least two areas containing the totality of information constituting said image; said one of said areas containing said additional information containing first and second spaced text patterns; said first and second text patterns containing related intelligence which is pertinent to said image; said first and second text patterns being capable of separate display independently of one another to describe a related characteristic of said image and projector means, including means for projecting a respective light beam through each of said areas to reproduce the information recorded therein and to project said image and said additional information in a selected position relative to each other.

7. The system of claim 6, wherein said film negative is a mono-color negative having a total of at least four of said separate, non-overlapping areas, each of at least three of which contains a respective mono-color image of said image to be stored, and wherein said projector means includes means for projecting a respective light beam through each of at least said four areas to reproduce the information recorded therein, and further includes means for recombining those of said light beams which are projected through those of said areas in which is recorded the information contained in said stored image, to form a single beam to recombine said colors and reproduce said storage image.

8. The combination of claim 7, wherein the film comprises a black and white film negative and said at least three areas that contain said mono-color images contain respective black and white images.

9. The combination of claim 7 wherein said at least three separated, non-overlapping areas containing mono-color images record the red, green and blue color contents respectively of said color image.

10. The system of claim 6, wherein said projector means further comprises masking means for projecting only selected portions of said additional information.

11. In combination: a photographic film for storing an image and additional information, and an apparatus for applying said image and said additional information to said film; said film comprising a negative having a first area containing said additional information and at least a second separate, non-overlapping area containing the information contained in said image; said first area containing said additional information containing first and second spaced text patterns; said first and second text patterns containing related intelligence which is pertinent to said image; said first and second text patterns being capable of separate display independently of one another to describe a related characteristic of said image; said apparatus including means for viewing said image and said additional information.

12. The combination of claim 11, wherein said area containing said additional information contains textual information in at least two languages.

13. The combination of claim 11, wherein said second area of said film further comprises at least three separate and non-overlapping sub-areas, each containing a respective mono-color image of said stored image.

14. The combination of claim 13, wherein said film comprises a black and white film negative and said areas of said film contain respective black and white images.

15. The combination of claim 13 wherein said at least three separated, non-overlapping sub-areas containing said mono-color images record the red, green and blue color contents respectively of said image.

16. The method of storing a two-dimensional color image and additional information, comprising the steps of:
separating said image into a plurality of two-dimensional, single-color components;
applying each of said components to a respective separate, non-overlapping two-dimensional mono-color photosensitive area of a photographic film to store the two-dimensional intensity values of each of said components as a respective mono-color image;
producing text information constituting said additional information and comprising first and second text patterns containing related intelligence which is pertinent to said image; and
applying said additional information to an additional separate, non-overlapping area of said film.

17. The method of claim 16 wherein said plurality of photosensitive negative areas are black and white photosensitive negative areas to store the two-dimensional intensity values of each of said color components as a black and white image.

18. The method of claim 16 which includes the further step of modulating each of said color image components for a desired color correction before their application to said respective negative areas.

19. The method of claim 16 which includes the further step of modulating each of said color image components for a desired color correction before their application to said respective negative areas.

20. The method of claim 16, comprising the further steps of:
projecting a respective single-color beam through each of said mono-color images, each of said beams corresponding in color to the original color used to produce the corresponding one of said mono-color images, and projecting an additional beam through said additional area of said film to project at least selected text patterns of said additional information on said film; and
recombining said single-color beams to project a single two-dimensional image corresponding to said two-dimensional color image.

21. The method of claim 20 wherein said photosensitive negative areas are black and white photosensitive negative areas to store the two-dimensional intensity values of said color components as black and white images.

* * * * *

UNITED STATES PATENT AND TRADEMARK OFFICE
CERTIFICATE OF CORRECTION

PATENT NO. : 4,230,408
DATED : October 28, 1980
INVENTOR(S) : Jurg Nigg

It is certified that error appears in the above—identified patent and that said Letters Patent is hereby corrected as shown below:

On the first page, the line under Item [30] entitle "Foreign Application Priority Data", should read as follows:

Dec. 14, 1972 [CH] Switzerland ......................18254/72

Signed and Sealed this

Twenty-eighth Day of April 1981

[SEAL]

Attest:

RENE D. TEGTMEYER

Attesting Officer

Acting Commissioner of Patents and Trademarks